Sept. 9, 1969  A. B. E. ELLIS  3,466,391
ELECTRICAL POSITION RESOLVER EMPLOYING CAPACITIVE PROBE
COUPLED TO RESISTIVE LAYER CONTAINING TWO PAIRS
OF CONDUCTIVE STRIPS ENERGIZED BY FOUR
DIFFERENT FREQUENCY SIGNALS
Filed Aug. 21, 1967

INVENTOR
Alfred Brian Edwin Ellis
BY
Baldwin Wight Diller & Brown
ATTORNEYS

United States Patent Office 3,466,391
Patented Sept. 9, 1969

3,466,391
ELECTRICAL POSITION RESOLVER EMPLOYING CAPACITIVE PROBE COUPLED TO RESISTIVE LAYER CONTAINING TWO PAIRS OF CONDUCTIVE STRIPS ENERGIZED BY FOUR DIFFERENT FREQUENCY SIGNALS
Alfred Brian Edwin Ellis, Essex, England, assignor to The Marconi Company Limited, London, England, a British company
Filed Aug. 21, 1967, Ser. No. 662,179
Claims priority, application Great Britain, Sept. 7, 1966, 40,056/66
Int. Cl. G01r 27/26
U.S. Cl. 178—18   3 Claims

ABSTRACT OF THE DISCLOSURE

Electrical position resolvers normally have a resistive layer to which two pairs of parallel strips are connected. Two different frequency signals are applied between the strip of each pair. A probe, capacitively coupled to the layer, is moved across it and its position is determined by the amplitude of the two signals it picks up. Errors are caused by variation of the distance (and thus the coupling) between the probe and the layer. The invention applies four different frequency signals to the strips and derives from the probe two output signals independent of the capacity coupling, one proportional to the amplitude ratio of two of the signals and the other proportional to the amplitude ratio of the remaining two.

---

This invention relates to arrangements including what are herein termed electrical position resolvers, that is to say devices wherein the position of a member relative to a surface across which said member is movable, is resolved and translated into two electrical signals representative respectively of the two co-ordinates of position of said member. More specifically the invention relates to arrangements including electrical position resolvers of the kind wherein the surface is provided with a resistive layer to which connection is made by means of two pairs of parallel strips—those of one pair being perpendicular to those of the other—and different input frequencies are applied between the strips of each pair, the movable member being a pick-up probe which is movable over a protecting insulating layer which is provided over the resistive layer, said probe being capacitatively coupled through said insulating layer to the part of the resistive layer for the moment beneath it so as to pick up from said part signals compounded of different input frequencies in proportions dependent on the position of said probe on the surface.

Figure 1:
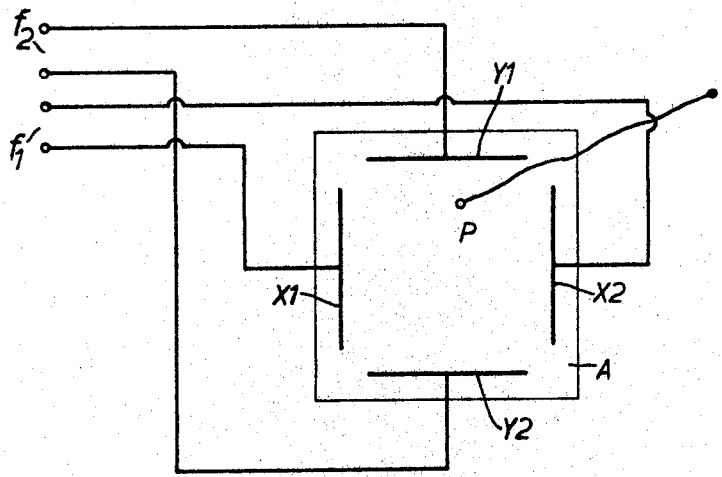
Figure 2:
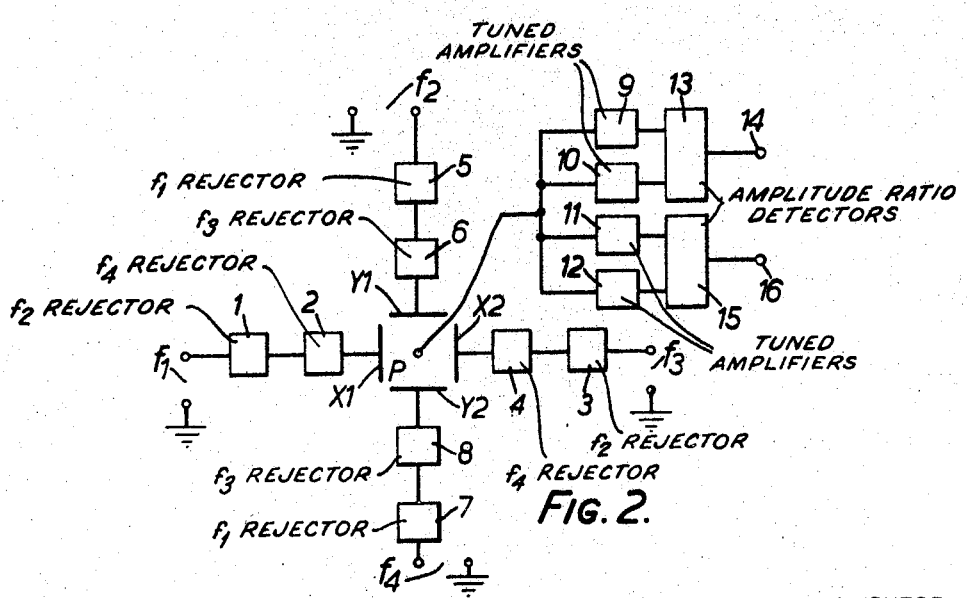

The invention is illustrated in and explained in connection with the accompanying drawings in which FIGURE 1 shows diagrammatically a typical known electrical position resolver of the kind referred to and FIGURE 2 shows diagrammatically one embodiment of this invention.

Referring to FIGURE 1, the electrical position resolver therein illustrated consists of a base plate A, e.g. a glass plate which might, in typical practice, be a square plate with a side of, say 10″, in which is deposited a thin layer (not separately shown) of suitable resistive material. Connection to the resistive material is made by means of two pairs X1X2 and Y1Y2 of connecting strips lying along the sides of a square, the strips of each pair being parallel. Two different readily separable input frequencies $f_1$ and $f_2$ are applied to the two pairs of strips. They may be applied, as shown in push-pull between the strips of the respective pairs—this balanced input feed is the one usually preferred—or, of course, a "single sided" feed may be used, one strip in each pair being earthed and the two frequencies being applied to the other two strips, one in each pair, with respect to earth. The resistive layer deposit is covered with a hard insulating layer to protect it and a probe P is movable over the insulating layer, making capacitative coupling with the resistive layer through the insulating layer at whatever position the probe may occupy. The amplitude of the signal of frequency $f_1$ picked up by the probe P will depend upon its position between the two strips X1 and X2 and similarly the amplitude of the signal of frequency $f_2$ picked up by the probe will depend on its position between the two strips Y1 and Y2. If, therefore, the output from the probe is filtered to separate the two frequency components and the separated components amplified and rectified, the resultant D.C. signals will be representative of the co-ordinates of the position of the probe. These signals can be utilized in any desired way, e.g. fed into a computer or presented to a display device such as a cathode ray tube, or employed to perform a desired control function.

Ideally the coupling capacity between the probe and the resistive layer should be the same for all operating positions of the probe. In practice, however, this ideal is not realised and substantial capacity variations occur because the separating distance of the probe from the resistive layer varies owing to less than careful manipulation of the probe and/or owing to non-uniformity of thickness of the insulating protecting layer which is between the probe and the resistive layer. Since this insulating layer is, in normal practice, as thin as is consistent with providing adequate protection, and has a quite high dielectric constant, small variations in its thickness can produce appreciable variations in probe-resistive layer coupling capacity. Variations in probe-resistive layer coupling capacity will produce errors in known arrangements employing electrical position resolvers of the kind referred to and the present invention seeks to avoid such errors.

According to this invention an arrangement including an electrical position resolver of the kind referred to comprises means for applying a voltage of a first frequency to one strip of one pair; means for applying a voltage of a second frequency to the other strip of that pair; means for appling a voltage of a third frequency to one strip of the other pair; means for applying a voltage of a fourth frequency to the other strip of said other pair; and means for deriving from the pick-up probe of the resolver two output signals one proportional to the amplitude ratio of signals of the first and second frequencies picked up by the probe and the other proportional to the amplitude ratio of signals of the third and fourth frequencies picked up by said probe.

In the preferred embodiment of the invention four applied input signal frequencies $f_1 f_2 f_3 f_4$ are employed, $f_1$ being applied through rejector circuits for $f_2$ and $f_4$ to one strip of one pair; $f_3$ being applied through rejector circuits also for $f_2$ and $f_4$ to the other strip of that pair; $f_2$ being applied through rejector circuits for $f_1$ and $f_3$ to one strip of the other pair; and $f_4$ being applied through rejector circuits also for $f_1$ and $f_3$ to the other strip of said other pair; and signals of the four frequencies derived from the probe are separated and fed to two ratio circuits or devices so connected and arranged that one provides an output representative of the amplitude ratio of signals of the frequencies applied to one pair of strips and the other provides an output representative of the amplitude ratio of signals of the other two frequencies.

Referring to FIGURE 2, four frequencies $f_1 f_2 f_3$ and $f_4$ are employed as input frequencies to the resolver. Frequency $f_1$ is applied to strip X1 through repector circuits 1 and 2 tuned to reject $f_2$ and $f_4$ respectively and frequency $f_3$ is applied to strip X2 through rejector circuits 3 and 4 also tuned to reject $f_2$ and $f_4$ respectively. Similarly frequencies $f_2$ and $f_4$ are applied to strips Y1 and Y2 respectively, in each case through rejector circuits 5 and 6 or 7 and 8 of which 5 and 7 are tuned to reject $f_1$ and 6 and 8 are tuned to reject $f_3$. The rejector circuits may conveniently be parallel tuned circuits.

Output from the probe P is taken to four amplifiers 9, 10, 11 and 12 which are tuned to select and amplify signals of the frequencies $f_1 f_3 f_2$ and $f_4$ respectively. These amplifiers are of the same gain and may, if desired, be made of adjustable gain to facilitate gain balance. The outputs of amplifiers 9 and 10 are fed to a ratio detector 13 of any suitable known form which provides at output terminal 14 a signal which is proportional to the amplitude ratio of the signals of frequencies $f_1$ and $f_3$. By means of a similar ratio detector 15 fed from amplifiers 11 and 12 there is obtained at the second output terminal 16 a signal proportional to the amplitude ratio of the signals of frequencies $f_2$ and $f_4$. The signals at 14 and 16, which are taken off for display or other utilisation, will be representative of the co-ordinates of the position of the probe P and will be free of errors due to variations in the coupling capacity between the probe and the resistive layer of the resolver. This will be understood from a consideration of the effect of the inputs applied to either of the two pairs of strips. Consider the inputs $f_1 f_3$ applied to the strips X1 and X2 respectively. Component signals of frequency $f_1$ picked up by the probe will decerase in amplitude as the probe P is moved away from X1 towards X2 but picked-up component signals of frequency $f_3$ will increase in amplitude with movement of the probe P from X1 to X2. The ratio signals obtained at terminal 14 will therefore be representative of the component of probe position in the X1–X2 direction and independent of the capacity coupling between the probe and the resistive layer. Similarly the signal at terminal 16 will be representative of the component of probe position in the Y1–Y2 direction and independent of the capacity coupling.

I claim:

1. An electrical position resolver wherein the position of a member relative to a surface across which said member is movable is resolved and translated into two electrical signals representative respectively of two co-ordinates of position of the member, said surface having a resistive layer to which electrical connection is made by means of two pairs of parallel conductive strips, those of one pair being perpendicular to those of the other, the movable member being a pick-up probe which is movable over a protecting insulating layer which is provided over the resistive layer, said probe being capacitatively coupled through said insulating layer to a portion of the resistive layer beneath it so as to pick up from said portion signals dependent on the position of said probe on the surface, the improvement comprising means for applying a voltage of a first frequency to one strip of one pair; means for applying a voltage of a second frequency to the other strip of said one pair; means for applying a voltage of a third frequency to one strip of the other pair; means for applying a voltage of a fourth frequency to the other strip of said other pair; and means for deriving from said pickup probe first and second output signals, the first output signal proportional to the amplitude ratio of signals of the first and second frequencies picked up by the probe and the second output signal proportional to the amplitude ratio of signals of the third and fourth frequencies picked up by said probe.

2. The electrical position resolver as claimed in claim 1 wherein said means for applying a voltage of a first frequency to one strip of said one pair includes rejector circuits for the third frequency and the fourth frequency; said means for applying a voltage of a second frequency to the other strip of said one pair includes rejector circuits for the third frequency and the fourth frequency; said means for applying a voltage of a third frequency to one strip of the other pair includes rejector circuits for the first frequency and the second frequency; said means for applying a voltage of a fourth frequency to the other strip of said other pair includes rejector circuits for the first frequency and the second frequency; and the means for deriving from said pick-up probe includes means coupled to said probe for separating signals of the first, the second, the third and the fourth frequencies and providing the first output signal representative of the amplitude ratio between signals from said probe of the first and second frequencies and the second output signal representative of the amplitude ratio between signals from said probe of the third and fourth frequencies.

3. The electrical position resolver as claimed in claim 1 wherein said means for applying a voltage of a first frequency to one strip of said one pair includes rejector circuits for the third frequency and the fourth frequency; said means for applying a voltage of a second frequency to the other strip of said one pair includes rejector circuits for the third frequency and the fourth frequency; said means for applying a voltage of a third frequency to one strip of the other pair includes rejector circuits for the first frequency and the second frequency; said means for applying a voltage of a fourth frequency to the other strip of said other pair includes rejector circuits for the first frequency and the second frequency, and means for deriving from said pick-up probe includes filter means for separating signals of the first, the second, the third and the fourth frequencies; means for feeding separated signals of the first and second frequencies to a first amplitude ratio detector for producing the first output signal; and means for feeding separated signals of the third and fourth frequencies to a second amplitude ratio detector for producing the second output signal.

References Cited
UNITED STATES PATENTS

| | | | |
|---|---|---|---|
| 2,583,720 | 1/1952 | Adler | 178—19 |
| 2,892,152 | 6/1959 | Buisson | 324—61 |
| 3,249,865 | 5/1966 | Hanken | 324—61 |
| 3,342,935 | 9/1967 | Leifer et al. | 178—19 |

EDWARD E. KUBASIEWICZ, Primary Examiner

J. M. HANLEY, Assistant Examiner

U.S. Cl. X.R.

324—61, 71